A. W. LINDLEY.
Reversible Water Wheel.

No. 169,112.  Patented Oct. 26, 1875.

Witnesses.
Arthur Wright,
C. A. Johnson.

Inventor, Alfred W. Lindley,
Attorney, Thomas G. Orwig.

UNITED STATES PATENT OFFICE.

ALFRED W. LINDLEY, OF DES MOINES, IOWA.

IMPROVEMENT IN REVERSIBLE WATER-WHEELS.

Specification forming part of Letters Patent No. 169,112, dated October 26, 1875; application filed April 30, 1875.

*To all whom it may concern:*

Be it known that I, ALFRED W. LINDLEY, of Des Moines, Iowa, have invented a Reversible Water-Wheel, of which the following is a specification:

The object of my invention is to construct a water-wheel in such a manner that it can be used as a breast-wheel in a vertical position, or as a turbine-wheel in a horizontal position, and its motion reversed at pleasure. It consists in a wheel having buckets or chambers in its periphery and an adjustable bottom or piston in each chamber, in combination with an adjustable cam and a stationary case, having two fixed cams and two inlet and one outlet ports, all as hereinafter fully described.

Figure 1:
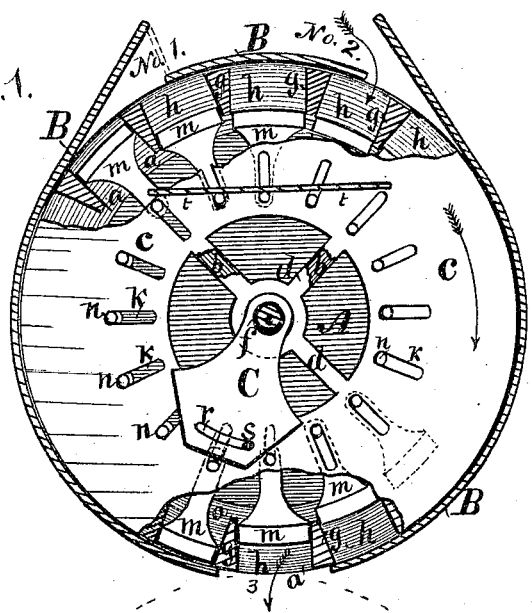

Figure 1 of my drawing is a plan view, illustrating the construction and operation of my complete wheel.

A A represent one side of my stationary case. B B is the rim designed to connect the two sides. Nos. 1 and 2 are inlet-ports through the rim B, and are covered by suitable boxing to direct the water. No. 3 is an outlet-port in the opposite side of the rim. The case may be cast solid, or formed in sections, joined together in any suitable way, and vary in size, as required for wheels of different capacities. $a$ $a$ represent the under side of my wheel, connected with its hub and the shaft $f$ by the arms $b$, in such a manner as to form an open or skeleton side. $c$ $c$ is the upper side of the wheel, connected with the hub by the arms $d$. $f$ is a shaft, rigid with the hub and wheel $a$ $b$ $c$ $d$, and has its bearings in the case A B, the upper side of which case is not shown. $g$ $g$ represent a series of partitions between the two sides of the wheel, cast solid therewith, or rigidly secured thereto in any suitable way, to form a series of chambers or buckets, $h$. $k$ $k$ represent a series of radial slots in the upper side of the wheel $a$ $b$ $c$ $d$. $m$ $m$ represent a series of pistons in the chambers $h$. Each piston has an arm or stem extending toward the center of the wheel, and on the end of each stem is a pin or stud projecting outward through the radial slots $k$ in the side $c$ $c$. C is an adjustable three-sided cam, pivoted to the shaft $f$. The one side or end curves outwardly relative to the axis of the wheel, and the other two sides of the cam run in opposite directions, at angles of about forty-five degrees relative to the shaft $f$. $r$ is a curved slot in the end of the cam C. $s$ represents a rigidly-fixed cam or stud, projecting from the inside of the upper plate or side of the case A B, and extending into the curved slot $r$ in the cam C. $t$ $t$ represent an elongated rigidly-fixed cam projecting from the inside of the same upper plate or side of the case A B, and in a position opposite from the cam or stud $s$ on the same plate.

Figure 2:
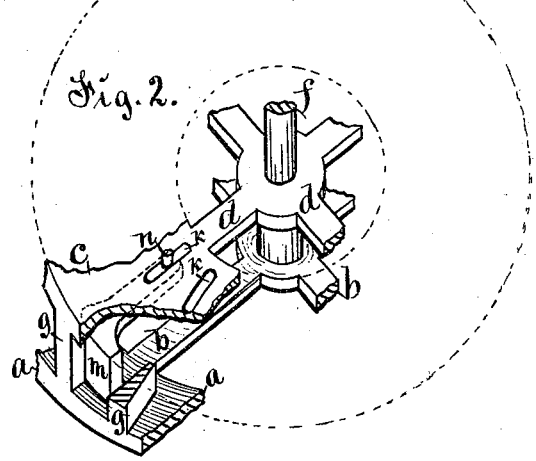

Fig. 2 is a perspective view of a section of my wheel, and illustrates the form of the pistons $m$ and their positions relative to the chambers $h$.

In the practical operation of my wheel, used in a vertical or horizontal position, one of the inlet-ports is closed, and the water enters the other and fills the chambers $h$ as they successively come under the open port. The pressure of the water rotates the wheel, and when the filled chambers or buckets approach the outlet-port No. 3, the cam C engages the studs $n$ on the stems of the pistons $m$, and forces the pistons outward to expel the water and close the chambers $h$ as they successively pass the open outlet-port No. 3. When the chambers thus closed approach the opposite side of the wheel, and before they reach the open inlet-port, the cam $t$ $t$ engages the stud $n$, and forces back the pistons $m$ to open the chambers $h$ successively before they appear under the open inlet-port. To reverse the motion of the wheel, close the open inlet-port and open the closed one.

Any suitable means may be employed for alternately opening and closing the inlet-ports. The slot $r$ in the cam C allows the cam to adjust itself as required relative to the open outlet-port whenever the motion of the wheel is reversed.

I claim as my invention—

1. In a water-wheel, the case A B, having two inlet-ports, Nos. 1 and 2, and one outlet-port, No. 3, and cams $s$ and $t$ $t$, to operate pistons $m$, substantially as and for the purposes shown and described.

2. The wheel $a$ $b$ $c$ $d$, having a series of chambers or buckets, $h$, and a series of radial slots, $k$, in combination with a series of adjustable pistons, $m$, having studs $n$ on their stem, substantially as and for the purposes shown and described.

3. The three-sided adjustable cam C, having slot r, in combination with the wheel a b c d, carrying the pistons m, substantially as and for the purposes shown and described.

4. The combination of the case A B, having ports Nos. 1, 2, and 3, and cams s and t t, the wheel a b c d, having radial slots k and chambers h, the adjustable pistons m, and the adjustable cam C, substantially as and for the purposes shown and described.

ALFRED W. LINDLEY.

Witnesses:
ARTHUR WRIGHT,
L. A. CRANE.